March 28, 1939. H. VAN TONGEREN 2,152,115
DUST COLLECTOR
Filed May 5, 1937   4 Sheets-Sheet 1
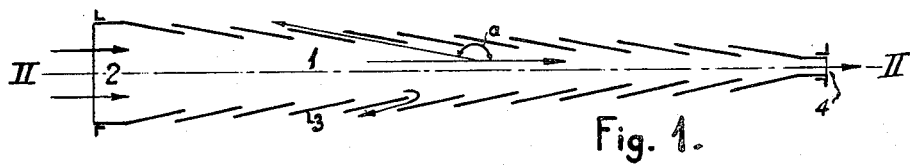
Fig. 1.
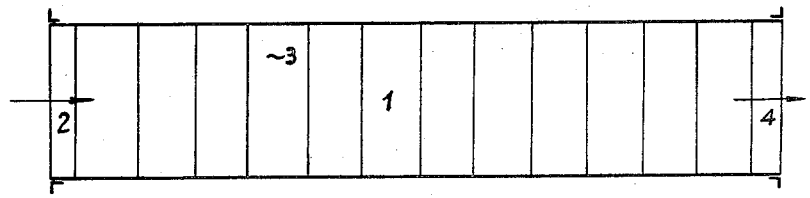
Fig. 2.
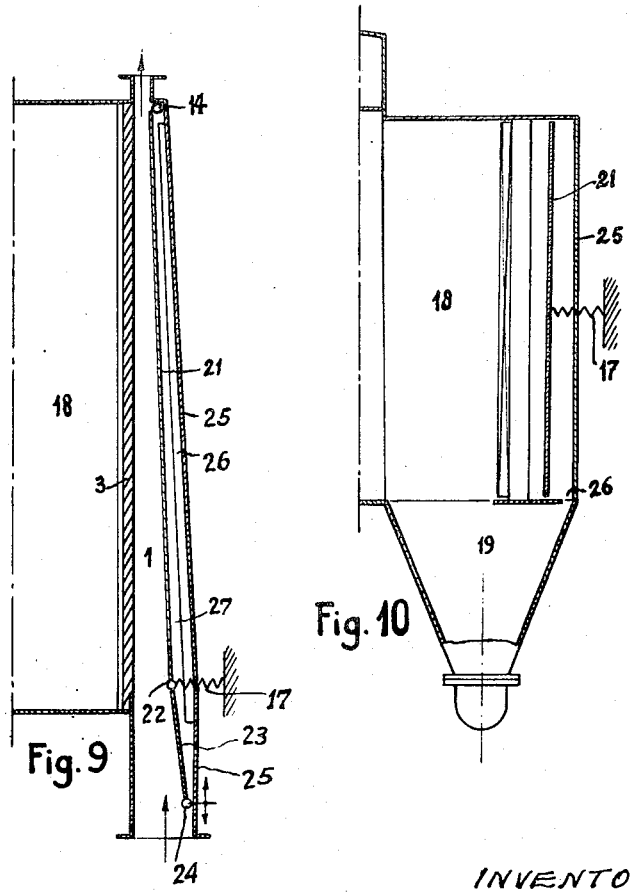
INVENTOR
HERMANNUS VAN TONGEREN March 28, 1939.  H. VAN TONGEREN  2,152,115
DUST COLLECTOR
Filed May 5, 1937  4 Sheets-Sheet 2
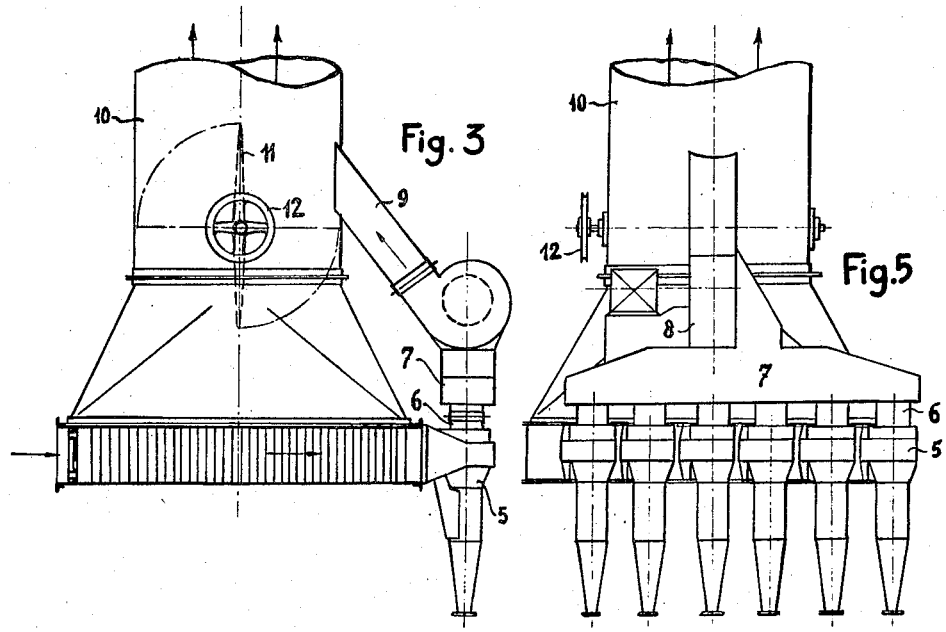
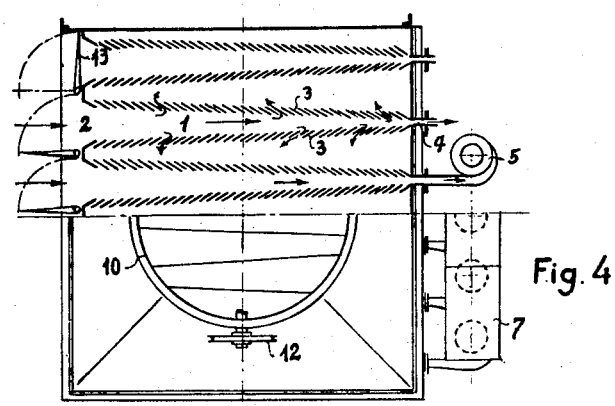
INVENTOR
HERMANNUS VAN TONGEREN March 28, 1939. H. VAN TONGEREN 2,152,115
DUST COLLECTOR
Filed May 5, 1937 4 Sheets-Sheet 3

INVENTOR
HERMANNUS VAN TONGEREN

March 28, 1939. H. VAN TONGEREN 2,152,115
DUST COLLECTOR
Filed May 5, 1937 4 Sheets-Sheet 4

INVENTOR
HERMANNUS VAN TONGEREN

Patented Mar. 28, 1939

2,152,115

UNITED STATES PATENT OFFICE 2,152,115

DUST COLLECTOR

Hermannus van Tongeren, Heemstede, Netherlands

Application May 5, 1937, Serial No. 140,987
In Great Britain May 8, 1936

18 Claims. (Cl. 183—110)

This invention relates to dust collectors for removing dust and grit from dust-laden air, flue gases and so forth.

As is well known, in any stream of dust-laden gas the dust particles tend to preserve their initial direction and move straight on. The particles tend to move downwardly under the action of gravity, but since they are of very small mass, equilibrium is quickly established between the effects of gravitation and the density and frictional resistance of the gas, so that each particle falls with a certain constant velocity in accordance with Stokes' law. This velocity is too small to allow a particle to reach the bottom of the conduit through which gas is flowing if the velocity of the gas is fairly considerable. If the gas flow follows a bend in the conduit, it will tend to move the suspended dust particles in the same direction as it is moving itself, but since the particles themselves tend to continue moving straight on their paths will have a component at right angles to the direction of the gas flow. Consequently, if the gas flow passes round a sharp bend, the dust particles will be concentrated on the outside of the bend, and if only a small proportion of the gas flow is caused to move round the bend while the main gas flow moves straight on, the dust particles which were originally suspended in the gas which escapes around the bend will reach the main gas flow and be carried along by it. This is the principle underlying the present invention.

According to the present invention, a dust collector is provided with one or more conduits, the cross-section of which is substantially rectangular and decreases from the inlet towards the outlet end of the conduit owing to the convergence of two of the walls, the other two walls being parallel to each other, at least one of the walls of each conduit being formed by vanes which are inclined so that the direction of flow of the gas escaping between the vanes is approximately opposite to that of the main gas flow along the conduit, substantially all the dust which was originally in the escaping gas being carried by the main gas flow along the conduit to a dust-bunker or shunt collector.

Sometimes it is desirable that the quantity of the gas escaping per unit of length in the neighbourhood of the entrance of the collector is larger than that escaping in the neighbourhood of the exit, since near the entrance the dust load of the gas is small, whereas at the end it is large owing to the fact that the dust is concentrated in a small quantity of gas. Preferably, the major portion of the gas must escape where the dust load is small, so that no appreciable quantity of dust can be carried along by the escaping gas. This may be attained by making the angle of deflection of the vanes smaller near the entrance than near the outlet, and/or by making the pitch—i. e. the spacing apart—of the vanes and the width of the gaps therebetween larger near the entrance than near the outlet end. As in this construction the quantity of gas in the conduit decreases degressively, the cross sectional area of the conduit must also decrease degressively from the entrance toward the exit thereof if a constant velocity of the gas throughout the conduit is desired. Preferably one or two of the walls of the conduit are made movable for the purpose of regulating the collector in accordance with the load, and the movable wall, or each of the movable walls if there is more than one of them, may be constituted by a vaned frame.

In one arrangement in accordance with the invention, two opposite walls of each conduit are formed by two rows of vanes which converge towards the outlet end of the conduit.

The rectangular cross-section of the conduit and the constant height of the vaned wall have the following advantages, which cannot be obtained by other shapes of the conduit:

1. The volume escaping through the vaned wall per unit of length of the conduit is constant, so that the velocity of the gas behind the vaned wall is almost constant over the cross-section of the gas stream. Thus, eddy currents, which tend to increase the resistance of the collector, will be avoided. Moreover, if this type of dust-collector is used as a pre-collector, the partially cleaned gas being immediately introduced into other collectors, in which the finer dust particles are caught, it is most desirable that the escaping gas volume per unit of length is constant in order that each of the final collectors receives a predetermined proportion of the gas, irrespective of the place from which the gas is sucked away.

2. The end of the conduit can be connected directly to a cyclone collector, in which the dust is caught, so that the unit is compact.

3. The vanes can be easily connected in such a manner, that they are revoluble about individual axes, so that the angle of deflection of the gas flows escaping between the vanes can be varied.

4. The cross-section of the conduit can easily be varied in accordance with the load by moving one of the walls of constant height, or both of them, toward and away from the axis of the conduit, so that a constant velocity of the gas can be maintained when the load varies.

In order that the invention may be clearly understood and readily carried into effect, it will now be described by way of example with reference to the accompanying diagrammatic drawings, in which:

Figure 1 is a sectional plan view illustrating the principle of the improved form of dust collecting conduit;

Figure 2 is a central vertical section on the line II—II of Figure 1;

Figure 3 is a side view of a dust collecting arrangement in accordance with the invention showing one of the conduits in cross-section;

Figure 4 is a plan view partly in section of the arrangement shown in Figure 3;

Figure 5 is a further view, in elevation, of the arrangements shown in Figures 3 and 4, seen from the right of Figure 3;

Figures 9 and 10 show respectively in plan and elevation a further form of construction of conduit;

Figure 6:
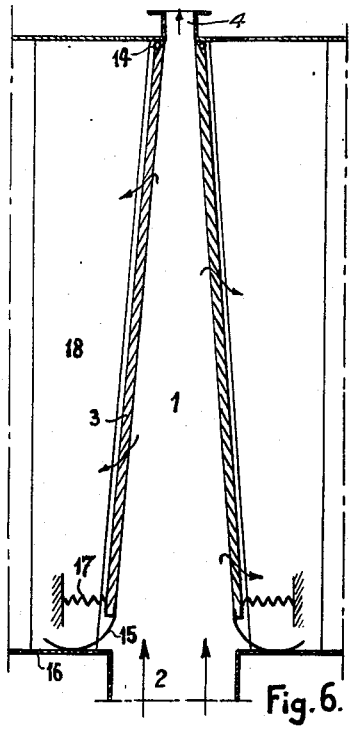
Figures 6 and 7 show respectively in plan and elevation, a conduit having two opposite sides each formed by a row of vanes.

Referring first to Figures 1 and 2, which illustrate the principle underlying the invention, the dust-laden gas enters the conduit 1, which is of substantialy rectangular cross-section, through an inlet 2. The two vertical and opposite walls of the conduit are each formed by a row of vanes 3 which converge towards the outlet end 4 of the conduit. Thus, although the cross-section of the conduit decreases towards the outlet end, it will be seen from Figure 2 that the other two walls of the conduit are parallel to each other. As indicated in Figure 1, the vanes are so inclined to the direction of the main gas flow along the conduit that the angle $a$ is obtuse and in fact approaches 180 degrees. It will be seen that the angle $a$ is the angle between the direction of the main gas flow along the conduit and the direction taken by the partial gas flows which proceed through the spaces between the vanes. The action of the arrangement should be clear from what has already been said, but it must be emphasized that by making the angle $a$ very obtuse, as shown, the bend which the gas escaping between the vanes has to make is correspondingly sharp, and therefore the dust particles which tend to move straight on when they originally enter the conduit are very soon out of the influence of the partial gas flows escaping between the vanes. Of course, it is impossible to make the angle $a$ equal to 180 degrees, for then there would not be any passage between the vanes, but this angle should always be as large as possible, its actual value being regulated in accordance with the load.

It will be appreciated that practically all the dust which originally enters through the inlet 2 is concentrated in a much smaller volume of gas at the outlet end 4 because of the reduced cross-section at the outlet end and also because some of the gas is escaping all the time between the vanes and delivering its dust to the main gas flow.

In order that the gas which escapes between the vanes may be as clean as possible, the following conditions must be observed:

(a) The velocity of the main gas flow should be high because then the dust particles are also moving rapidly and their kinetic energy is large, thus facilitating their separation from the partial gas flows which escape between the vanes. However, as there is a certain velocity of the main gas flow which is sufficient for the purpose and as higher velocities give rise to high resistances to flow, it is advantageous to keep the velocity nearly constant throughout the conduit. This is readily achieved by means of the invention because the conduit decreases in cross-section from the inlet to the outlet end owing to the convergence of only two of its walls, while the spacing between the other two walls remains constant.

(b) The velocity of the gas flow between the vanes should be small for then the velocity of flow at the entrance to the space between each pair of vanes is also small, so that in the neighbourhood of this entrance the dust particles have a greater velocity than the gas, and consequently they move quickly across the partial gas flow to reach the main gas flow. It follows from this that the total cross-sectional area of the passages between the vanes must be large.

(c) The angle $a$ shown in Figure 1 must be very obtuse for the reasons explained above.

(d) The extent of the vaned surface of the conduit must be very large, for example, more than eight times the area of the inlet 2.

(e) The passage between each pair of vanes must be narrow because then a dust particle which is originally on the inside of the gas flow which bends around into the passage between the vanes can easily reach the outside of the gas flow and pass into the main flow. In short, it is necessary that the vanes should provide a large number of relatively narrow passages.

In the arrangement illustrated in Figures 3 to 5 there are six collectors of the kind described with reference to Figures 1 and 2 operating in parallel. The outlet 4 of each conduit is connected to a cyclone 5 which collects the dust while the cleaned gas passes through the outlet 6 of each cyclone into a duct 7 which is common to all the cyclones and leads to the intake of a fan 8 which discharges the cleaned gas through a pipe 9 into a stack 10. The space above each of the conduits 1 is in open communication with the stack 10. The latter is fitted with a damper 11 controlled by the wheel 12. The inlet end of each of the conduits 1 is provided with a pivotal flap 13 so that if the load falls, one or more of the conduits 1 can be shut down.

Figure 7:
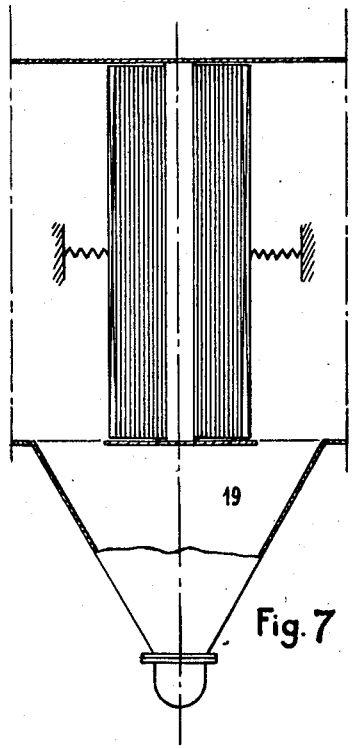

Figures 6 and 7 show a construction in which each of the two vertical and opposite sides of the conduit 1 consists of a vaned frame pivoted at one end about a vertical axis 14 and constituting a movable wall. At the end adjacent the gas inlet 2, each of the vaned frames is fitted with a curved plate 15 for the purpose of preventing leakage of gas along the ends 16 of the conduit. Each of the vaned frames is subjected to the action of a spring 17 or a weight tending to make the frames approach each other. The resistance to the flow of gas, which is occasioned by the vanes, sets up a difference of static pressure between the space 18 outside each row of vanes and the conduit 1. This difference of pressure tends to move the vaned walls away from each other and is assisted by the dynamic pressure of the main gas flow through the conduit. The springs 17 or their equivalent weights are adjusted so that there is equilibrium at the desired velocity of the gas flow. If the load falls, the resistance offered by the vanes decreases so that the static difference of pressure between the spaces 18 and the conduit 1 decreases and the dynamic pressure of the main gas flow also diminishes.

The result is that the springs move the walls inwardly until equilibrium is again reached.

Three main advantages result from the arrangement just described. First, the velocity of the gas flow remains constant, or practically constant. Secondly, the angle of deflection for the partial gas flows between the vanes increases when the load decreases, and consequently this angle assumes a value which is most efficient having regard to the decreased load. Thirdly, the amount of gas flowing through the outlet 4 remains constant so that if this gas is passed into a collector, the latter will always operate under full load, that is to say under the most efficient conditions.

As can be seen from Figure 7, a dust bunker 19 is located beneath the conduit 1, so that if any dust should happen to pass through either of the vaned frames it cannot accumulate and obstruct their movement.

Figure 8:
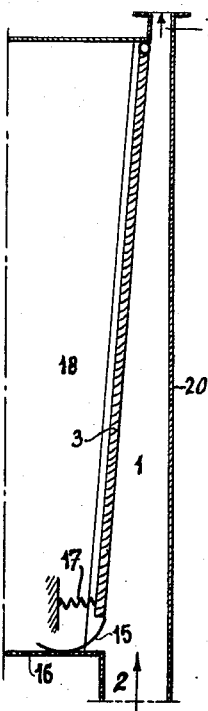
Figure 8 is a plan view of a conduit with only one of its sides formed by a row of vanes.

In the arrangement shown in Figure 8, it will be seen that there is only one vaned wall and this is arranged in the same way as either of the walls shown in Figure 6. In this case, however, the wall 20 of the conduit which is opposite the row of vanes is stationary and presents an unbroken surface. The purpose of this construction is that sometimes it is desirable that all the gas which escapes through the spaces between the vanes should move in one general direction.

In the arrangements shown in Figures 6 to 8, the vaned wall 3 may be moved by hand or by a servomotor and no spring 17 or equivalent weight is then used.

Figures 9 and 10 show a form of construction in which there is a single stationary row of vanes 3. The side of the conduit 1 opposite the row of vanes is formed by a movable wall 21 pivoted at one end about the vertical axis 14 and hinged at 22 to a plate 23 fitted with a roller joint 24 so that it can slide along an outer wall 25.

As can be seen from Figure 10 the bottom of the conduit 1 is shut off from the bunker 19 except for a slot 26 by which the space between the walls 21 and 25 is placed in communication with the space 18 by way of the bunker 19. The wall 21 is acted upon by the spring 17. In operation the static pressure in the conduit 1 is greater than in the space 18 owing to the fall of pressure due to the passage of the gas between the vanes 3, and therefore is also greater than in the space between the walls 21 and 25. Moreover, the dynamic pressure of the gas in the conduit has a component at right angles to the wall 21. The result is that the wall 21 is moved outwardly (i. e. towards the right) against the action of the spring 17 until equilibrium is reached. If the flow of gas diminishes, the amount passing between the vanes 3 will also decrease so that the static pressure difference between the spaces 1 and 18 and also between the space 1 and the space between the walls 21 and 25 decreases. Since the velocity of the gas in the space 1 also tends to decrease, the force pressing the wall 21 outwardly will be insufficient to prevent the spring 17 from moving the wall inwardly, so that the wall takes up a new position of equilibrium. Instead of using the spring 17 or its equivalent weight, the wall 21 may be moved by hand or by a servomotor and there is then no need to have the slot 26.

Figure 11:
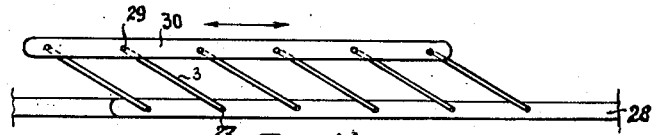
Figures 11 and 12 illustrate respectively in plan and elevation how the inclination of the vanes to the direction of the main gas flow along the conduit can be altered.
Figure 12:
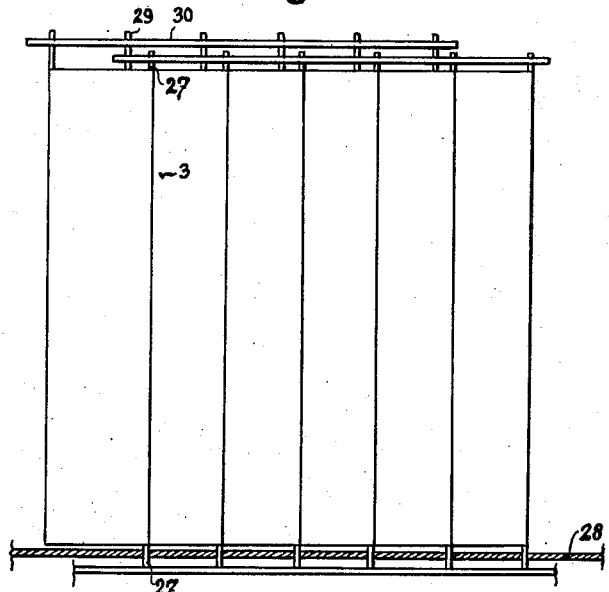

In cases where it is required to keep the weight of the components as low as possible, it is better not to use the constructions shown in Figures 6 to 8 which necessitate a comparatively heavy frame for the vanes. In such circumstances the relatively heavy wall 21 of the construction shown in Figures 9 and 10 should also be avoided, and the arrangement shown in Figures 11 and 12 used instead. Here each of the vanes is mounted on pivot pins 27 at the top and bottom, so that it can be turned about a vertical axis.

The pins 27 are held in two bars 28 extending along the top and bottom of the vanes. Each vane is also provided at the top with a pin 29 attached to a bar 30, and it will readily be seen from Figure 11 that the inclination of the vanes can be altered by simply moving the bar 30 longitudinally. If there is a reduction in the load, the vanes are turned so that the angle of deflection (angle $a$ in Figure 1) becomes larger, with the result that the quantity of gas escaping between the vanes decreases both on account of the narrower space between each pair of vanes and because the resistance to the partial gas flows is increased by the sharp bend they have to negotiate.

Of course, the velocity of the gas flow when the load is small cannot be as great as it is at full load, so that the benefit of a high velocity in the conduit is lessened when the load decreases. On the other hand the angle of deflection becomes much larger, as described above, resulting in a better cleaning action, and consequently the efficiency remains almost constant over a wide range of loads.

It is not necessary that all the vanes in one row should be regulated by the same bar 30. The vanes can be regulated in groups, each group being controlled by its own bar. In this way, when the load is light, it is possible to shut the vanes which are near the inlet end of a conduit so that they do not allow any gas to escape. Then since the velocity of the gas flow along the conduit increases as the cross-section decreases, the remainder of the collector functions under normal conditions.

The regulation of the angle at which the vanes are inclined to the direction of the main gas flow may be effected by arranging for the bars 30 to be actuated by the movement of some other part of the collector or by a servomotor.

Figure 13:
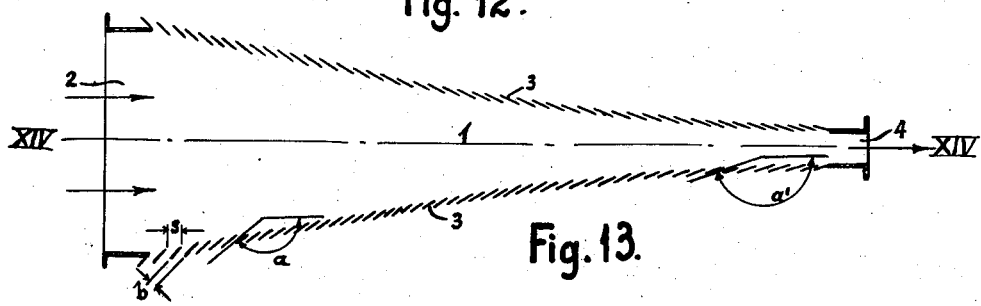
Figure 13 is a diagrammatic sectional plan view of a dust collecting conduit, in which the quantity of the gas, escaping per unit of length is larger near the entrance than near the exit.
Figure 14:
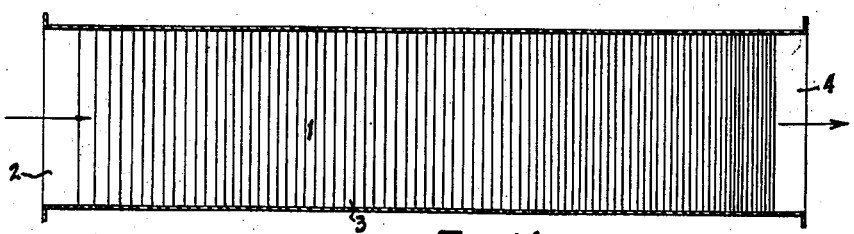
Figure 14 is a central vertical section on the line XIV—XIV in Figure 13.

In Figures 13 and 14, the vaned walls 3 of the conduit 1 are so shaped that near the inlet 2, where the dust load of the gas is still small, the greater part of the gas escapes, whereas near the outlet 4, where the dust load is heavy, only a small part of the gas escapes. The vanes are smaller near the inlet than near the exit, whereas the spacing apart—i. e. the pitch $s$—of the vanes is greater near the inlet than near the outlet, whereby the width of the spaces between successive vanes gradually decreases in the direction of the main flow. As shown, the cross-sectional area of the conduit decreases degressively from the inlet toward the outlet end thereof, so that the velocity of the gas remains constant, or substantially constant, throughout the length of the conduit.

What I claim is:

1. In a dust collector, walls forming a conduit the cross-section of which is substantially rectangular and decreases from the inlet towards the outlet end owing to the convergence of two of said walls, the other pair of said walls being parallel to each other, at least one of the walls of said conduit being formed by vanes which are inclined so that the direction of flow of the gas escaping between said vanes is approximately opposite to the direction of the main gas flow along the conduit, and at least one of said converging walls being movable to alter the angle of convergence.

2. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes which are inclined so that the direction of flow of the gas escaping between said vanes is approximately opposite to the direction of the main gas flow along the conduit, and at least one of the converging walls of each of said conduits being movable to alter the angle of convergence.

3. In a dust collector, walls forming a plurality of conduits each of which is bounded by two pairs of said walls and has a substantially rectangular cross-section which decreases from the inlet towards the outlet end by reason of the convergence of one of said pairs of walls, the walls of said pair being movable independently of each other while the other pair of said walls are disposed parallel to each other, at least one of the walls of each of said conduits being formed by vanes which are inclined so that the direction of flow of the gas escaping between said vanes is approximately opposite to the direction of the main gas flow along the conduit.

4. In a dust collector, walls forming a conduit the cross-section of which is substantially rectangular and decreases from the inlet towards the outlet end owing to the convergence of two of said walls, the other pair of said walls being parallel to each other, at least one of the walls of said conduit being constituted by a pivoted vaned frame the vanes of which are inclined so that the direction of flow of the gas escaping between said vanes is approximately opposite to the direction of the main gas flow along the conduit.

5. In a dust collector, walls forming a plurality of conduits each of which is bounded by two pairs of said walls and has a substantially rectangular cross-section which decreases from the inlet towards the outlet end by reason of the convergence of one of said pairs of walls, said converging pair of walls being movable relatively to each other to vary the angle of convergence and constituted by pivoted vaned frames the vanes of which are inclined so that the direction of flow of the gas escaping between the said vanes is approximately opposite to the direction of the main gas flow along the conduit.

6. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes which are inclined so that the direction of flow of the gas escaping between said vanes is approximately opposite to the direction of the main gas flow along the conduit, and one wall of each of said conduits being movable and having an unbroken surface.

7. In a dust collector, walls forming a conduit the cross-section of which is substantially rectangular and decreases from the inlet towards the outlet end owing to the convergence of two of said walls, the other pair of said walls being parallel to each other, at least one of the walls of said conduit being formed by vanes which are inclined so that the direction of flow of the gas escaping between said vanes is approximately opposite to the direction of the main gas flow along the conduit, at least one of the walls of said conduit being movable, and means for applying a force acting in the opposite direction to that exerted on said wall by the difference of pressure of the gas on opposite sides of said wall.

8. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes which are inclined so that the direction of flow of gas escaping between said vanes is approximately opposite to the direction of the main gas flow along the conduit, at least one of the walls of each of said conduits being movable, and a spring exerting a force on said movable wall in the opposite direction to that exerted by said wall by the difference of pressure of the gas on opposite sides of said wall.

9. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes which are inclined so that the direction of flow of the gas escaping between said vanes is approximately opposite to the direction of the main gas flow along the conduit, at least one of said converging walls being movable to alter the angle of convergence of said walls, and means for varying the inclination of said vanes to the direction of the main gas flow along the conduit.

10. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes which are inclined so that the direction of flow of the gas escaping between said vanes is approximately opposite to the direction of the main gas flow along the conduit, at least one of said converging walls being movable to alter the angle of convergence of said walls, and means for regulating the inclination of said vanes in groups.

11. In a dust collector, walls forming a conduit the cross-section of which is substantially rectangular and appreciably degressively decreases from the inlet towards the outlet end owing to appreciable degressive convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow.

12. In a dust collector, walls forming a conduit the cross-section of which is substantially rectangular and decreases from the inlet towards the outlet end owing to convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow, the width of the gaps between the vanes gradually decreasing from the inlet end towards the outlet end of the conduit.

13. In a dust collector, walls forming a conduit the cross-section of which is substantially rectangular and decreases from the inlet towards the outlet end owing to convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow, the angle of deflection of the vanes being smaller near the inlet end than near the outlet end of the conduit.

14. In a dust collector, walls forming a conduit the cross-section of which is substantially rectangular and degressively decreases from the inlet towards the outlet end owing to degressive convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow, the width of the gaps between the vanes gradually decreasing from the inlet end toward the outlet end of the conduit.

15. In a dust collector, walls forming a conduit the cross-section of which is substantially rectangular and degressively decreases from the inlet towards the outlet end owing to degressive convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow, the angle of deflection of the vanes being smaller near the inlet end than near the outlet end of the conduit.

16. In a dust collector, walls forming a conduit the cross-section of which is substantially rectangular and degressively decreases from the inlet towards the outlet end owing to degressive convergence of two of said walls, the other two of said walls being parallel to each other, said converging walls being formed by two rows of vanes so disposed that the direction of flow of the gas escaping between them is approximately opposite to the direction of the main gas flow along the conduit, whereby substantially all the dust which was originally in the escaping gas is carried along by said main flow, the width of the gaps between the vanes being greater near the inlet end than near the outlet end of the conduit, and the angle of deflection of the vanes being smaller near the inlet end than near the outlet end of the conduit.

17. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes inclined so that the direction of flow of the gas escaping between said vanes is approximately opposite to the direction of the main gas flow along the conduit, at least one of said converging walls being movable to alter the cross-sectional area of the conduit, and means for varying the inclination of said vanes to the direction of the main gas flow along the conduit.

18. In a dust collector, walls forming a plurality of conduits each of which is bounded by two pairs of said walls and has a substantially rectangular cross-section which decreases from the inlet towards the outlet end by reason of the convergence of one of said pairs of walls, the other pair of said walls being disposed parallel to each other, at least one of the walls of each of said conduits being formed by vanes inclined so that the direction of flow of the gas escaping between said vanes is approximately opposite to the direction of the main gas flow along the conduit, at least one of said converging walls being movable to alter the cross-sectional area of the conduit, and means for regulating the inclination of said vanes in groups.

HERMANNUS VAN TONGEREN.